United States Patent
Arkowski

[11] Patent Number: 5,857,632
[45] Date of Patent: Jan. 12, 1999

[54] CASTING FISHING REEL WITH TORQUE CONVERTER AND CLUTCH

[75] Inventor: Michael J. Arkowski, Florissant, Colo.

[73] Assignee: Flylogic, Inc., Melba, Id.

[21] Appl. No.: 712,340

[22] Filed: Sep. 11, 1996

[51] Int. Cl.[6] .................................................. A01K 89/02
[52] U.S. Cl. ......................... 242/297; 242/307; 242/317; 242/323; 192/45
[58] Field of Search .................................. 242/295, 296, 242/307, 303, 323, 310, 317, 297; 192/45

[56] References Cited

U.S. PATENT DOCUMENTS

| | | | |
|---|---|---|---|
| 1,730,332 | 10/1929 | Pflueger | 242/317 |
| 2,331,210 | 10/1943 | Lundblad | 242/295 |
| 3,510,083 | 5/1970 | Cook | 242/307 X |
| 4,162,049 | 7/1979 | Stutz, Jr. | 242/295 X |
| 4,750,687 | 6/1988 | Sievert et al. | 242/295 |
| 4,883,238 | 11/1989 | Harder | 242/323 X |
| 5,407,144 | 4/1995 | Ryall | 242/295 |
| 5,411,218 | 5/1995 | Uehara et al. | 242/303 X |

FOREIGN PATENT DOCUMENTS

| | | | |
|---|---|---|---|
| 616136 | 1/1949 | United Kingdom | 242/296 |
| 798025 | 7/1958 | United Kingdom | 242/307 |
| 815739 | 7/1959 | United Kingdom | 242/307 |
| 2203211 | 10/1988 | United Kingdom | 242/295 |

OTHER PUBLICATIONS

WO 94019937, Fly Fishing Reel, International Application Published Under PCT, Sep. 1994.

Primary Examiner—Donald P. Walsh
Assistant Examiner—Emmanuel M. Marcelo
Attorney, Agent, or Firm—Frank J. Dykas

[57] ABSTRACT

A casting reel is provided with a stationery reel spindle having a clutch cavity. A clutch assembly having a draw bar and a plurality of spring washers and a clutch plate is contained within the clutch cavity. A torque converter having a first race and a second race is also provided with the second race being free to rotate in one direction and engaging with and rotating with the first race in the other direction. The first race is in frictional engagement with the pressure plate which is slideably mounted on the stationary reel spindle and in frictional engagement with the clutch plate and the first race of the torque converter. A line spool is mounted on the stationary reel spindle and attached to the second race of the torque converter.

11 Claims, 8 Drawing Sheets

CASTING FISHING REEL WITH TORQUE CONVERTER AND CLUTCH

BACKGROUND OF THE INVENTION

1. Technical Field

This invention generally relates to fishing reels, and more particularly to a casting reel for fly fishing.

2. Background

There are many prior art fly fishing casting reel designs which have been developed. They are all based upon some general principles which do not change from reel to reel. The line spool freely rotates in one direction so that the fishing line freely reels onto the line spool, and is subject to frictional drag when it rotates in the other direction, as the fish, after the strike, attempts to swim away with the line.

Figure 1:
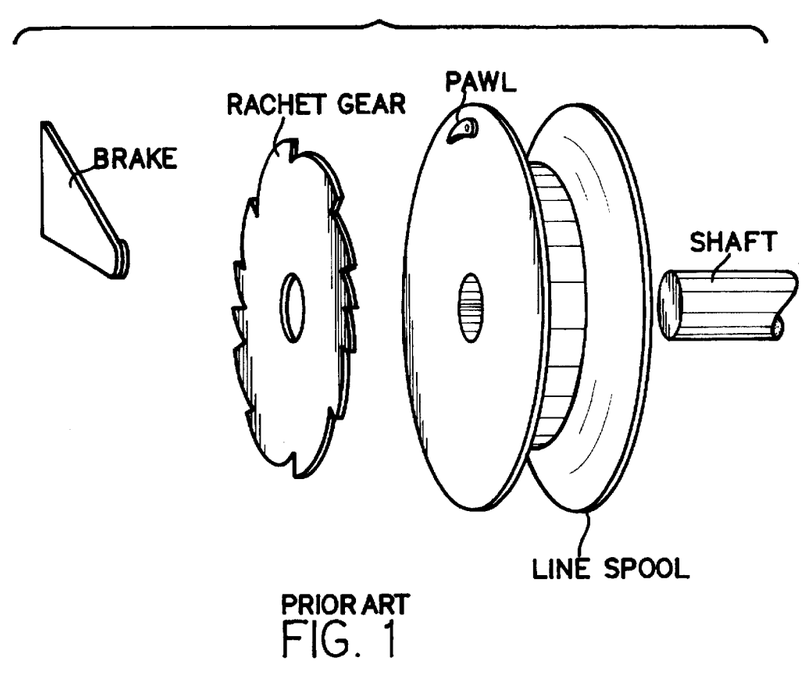
FIG. 1 is an exploded perspective representational view of a prior art casting reel.
Figure 2:
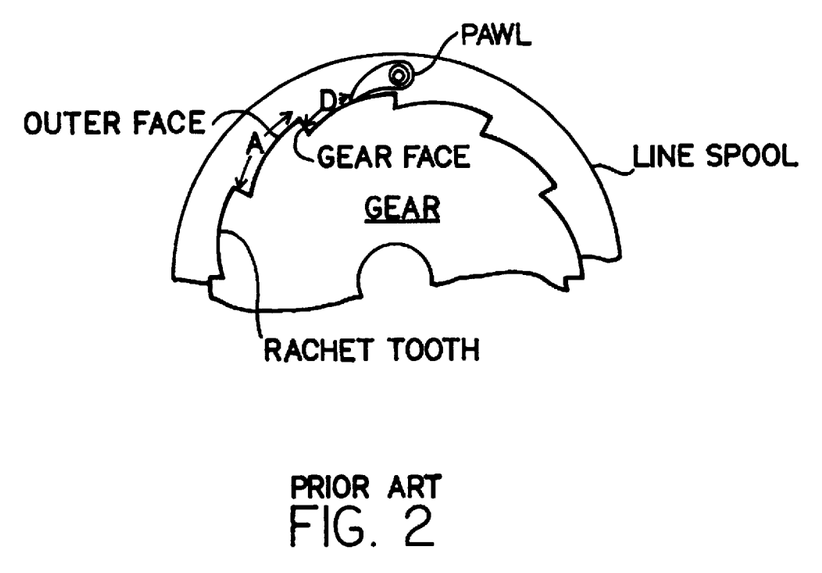
FIG. 2 is a partial plan view of a prior art casting reel ratchet gear and line spool.

A very simple prior art casting reel design is shown in prior art FIGS. 1 and 2. In this design, the line spool rotates around a fixed shaft. A ratchet gear is provided in close proximity to one of the side plates of the line spool, and is also rotatable about the shaft. A pawl ratchets across the ratchet pockets of the ratchet gear when the line spool is rotating in one direction, which is the direction in which the user would wind the spool to take in the line. In the other direction, the pawl slides back until it engages the face of one of the ratchet gear teeth, causing the ratchet gear and the line spool to be mechanically locked together for rotation in that direction. Some sort of an adjustable break is provided to frictionally engage the ratchet gear to provide the requisite frictional drag. Some prior art designs are more sophisticated than others, and certainly more sophisticated than that disclosed in prior art FIGS. 1 and 2, however, they all use some sort of a ratchet and pawl assembly. It is the pawl sliding over the ratchet teeth which provides the clicking noise that one usually hears in the prior art reel designs.

Another problem with conventional fly casting reels is that the clicking noise is sometimes too loud. It is inherent, in most ratchet and pawls, but in those cases where an artificial clicker is included to supplement the clicking noise of the inherent clicking noise, it can, under certain conditions, be too loud. A clicking noise is useful, since it enables the fisherman to gauge how fast the line is being taken out or in after the fish strike, but it can also be harmful. Fish are sensitive to noise, and a noisy fisherman can find himself fishing in a dry hole. As a result, most of the better prior art designs, if they provide a supplemental clicking noise maker, also provide some feature to turn it on or off. However, no provision is made in the prior art to adjust the noise level of the clicking sound.

The problem with the prior art ratchet and pawl assembly is that there is always a certain amount of unwanted free line withdrawal rotation from the line spool as the pawl slides back over the outer face of a ratchet tooth and into engagement with the gear face of the next ratchet tooth. The maximum amount of unwanted rotation is shown as arc "A" in FIG. 2. Arc "D" shows the typical amount of free rotation encountered with a fish strike. With large deep sea fishing reels this is usually not a problem, but, with a smaller fly fishing reels, for example, those used in trout fishing, it can become a significant problem.

Many of the world famous and truly world-class fly fishing streams, for example, Silver Creek near Sun Valley, Id., are managed as catch and release streams. This means the fly fisherman must use a barbless hook. As the fish strikes, the fisherman must set the hook by snapping the line taut at the precise moment of the fish strike. If there is a little bit of play in the reel as the pawl slides back over the outer face of the ratchet tooth, the line does not set instantaneously and the fish, since the hook is barbless, can disgorge it, as any fly fisherman who uses barbless hooks can attest to.

Another problem with the prior art fishing reels is the brake used to induce the frictional drag on the line spool. Most are simple frictional engagement pads, such as that shown in prior art FIG. 1. Some sort of mechanical adjustment is made with a spring, to which is attached a frictional pad which engages the ratchet gear. These brake mechanisms cannot usually be precisely controlled. Alignment problems caused by wobble of the ratchet gear on the shaft, heat induced by use, and weather conditions, whether it be high temperatures, low temperatures, rain and even humidity, can affect the amount of frictional drag. If the reel is a large one being used to catch 100 pound Marlin in coastal waters, it may not make much of a difference, but if it is a small reel being used for small fish, for example, trout in a mountain stream, the amount of frictional drag can be extremely important. The tensile strength of the tippet, which is the thin piece of line to which the fly is connected, may be quite low and subject to breakage if the force of the frictional drag exceeds the tensile strength of the tippet. Thus, precisely controlling the amount of frictional drag can be extremely important.

Accordingly, what is needed is a fly casting fishing reel which includes three improvements, the first, the provision for a locking mechanism where the frictional drag is instantaneously incurred when the fish strikes the line and attempts to take it; the second is a precisely controllable braking mechanism which is not readily affected by changes in temperature, or humidity or from continuous use.

The third object of the present invention is to provide a clicking noise maker to selectively simulate the noise of the ratchet and pawl, so as to assist the fisherman in determining the speed at which line is being taken from the reel after the fish strike. It is a further object of this invention to provide an adjustable sound artificial noise maker so that the user can selectively vary the amount of clicking noise and its degree of softness from a loud staccato clicking to a quietest of soft click, or even no click at all, so that the fisherman can accurately judge which way the line is going, in or out.

DISCLOSURE OF INVENTION

These objects are achieved in an improved casting reel which is provided with a reel spindle, a clutch assembly contained within the reel spindle, which applies pressure to a pressure plate, a pressure plate which transfers pressure from the clutch assembly to the inner race of a torque converter. The torque converter is a mechanical torque converter having an inner race and an outer race. The inner race is frictionally engaged with the pressure plate, the outer race is directly attached to a line spool. The outer race is free to rotate around the inner race in one direction to take in fishing line, however in the opposite direction, when line is being taken out, it locks up with the inner race and only rotates with the inner race which is frictionally engaged with the pressure plate.

The hollow reel spindle serves as a clutch cavity. A plurality of clutch spring washers are axially held on a clutch shaft which is provided with a stop plate at one end and is threaded at the other. A clutch plate, which is a bearing surface, caps the end of the plurality of clutch spring washers. The clutch shaft is threaded through a clutch shaft traveler nut fixing the reel spindle to the frame. A knob serving as a clutch shaft, or draw bar traveler, provides a means of compressing the spring washers, thereby creating drag by forcing the clutch plate towards the traveler end of the reel spindle.

The reel spindle is provided with a plurality of slots through which interfit corresponding pressure plate flutes formed integral with the pressure plate. An adjustment knob is provided on the threaded end of the clutch shaft and is used to draw in or extend away the clutch shaft to tighten or loosen the pressure against the plurality of clutch spring washers, thereby adjusting the frictional force the pressure plate will exert against the inner race of the torque converter.

The inner race of the torque converter assembly is provided with a plurality of roller bearing cavities each having two sections, the first section being for holding a coil spring, and the second for holding a roller bearing. The roller bearings and springs are held in position, together with the outer race against the outer bearing surface of the inner race by means of a containment plate flange.

When the outer race is rotating in one direction the ball bearings are forced out of the taper lock position and, rotate in the same direction as the outer race. When the outer race attempts to rotate in the other direction, the roller bearings will rotate in the opposite direction, and will be forced into the taper lock position, and wedge against a wedge point and the inner surface of the outer race. The wedging of the ball bearings locks the outer race to the inner race, and hence connects the line spool to the frictional engagement of the clutch.

The line spool is provided with a line spool arbor and rotates about the reel spindle. A bearing or bearings are provided between the two. The line spool is held in place at the back of the reel spindle by means of a clip which interfits around a notch formed integral with a threaded plug which closes the clutch cavity of the reel spindle. A back cover covers the clip providing a cosmetically pleasing appearance.

A plastic clicker gear is also attached to the outer race. The purpose of the clicker gear is to provide a source of clicking noise when its teeth are engaged against a corner of a clicker pawl. This is done to supply audible information to the user as to the rate at which the line is being pulled out during fishing.

The clicker pawl is rotatably hinged and held against the outer housing of the reel by means of the pivot pin. It is in resilient spring-like engagement with a pawl leaf spring.

As the clicker gear rotates its teeth may engage against a pointed corner of the pawl and as they pass by, snap the pawl against the spring, and as the tooth clears, snap back thereby making a clicking sound.

There are three corners to the generally triangular shaped pawl. A blunt corner is provided which does not engage with the teeth of the clicker when set. Thus the rotation of the clicker gear will not produce a clicking noise with the blunt pawl selected. The other two corners of the pawl are each of different radiuses and extensions from the center point of the pawl. A first corner extends the farthest out from the center point of the pawl. A first corner extends the farthest out from the center point of the pawl, and thus engages most deeply into the teeth of the clicker gear. Thus, when the first corner of pawl passes over the top of the tooth of the clicker gear, it snaps quickly over the gear tooth and onto the next gear thereby producing a sharp loud clicking noise. The second corner of the pawl ends at a point slightly closer to the center point of the pawl and as a result this second corner does not engage as deeply into the teeth of the clicker gear. In this pawl configuration the clicking noises are quieter than they are if the first corner is used. Again, there are two different radiuses to the corner, one producing a more staccato like click and the other a softer or muted click. The user can adjust to which direction the staccato like click occurs merely by indexing the pawl over from one side to the other.

The stationary outer housing, or frame, is configured with the rotating line spool. It provides a clean, relatively weather proof case for the line spool. A conventional handle, and counter weight are provided to complete the assembly.

BEST MODE FOR CARRYING OUT INVENTION

Figure 3:
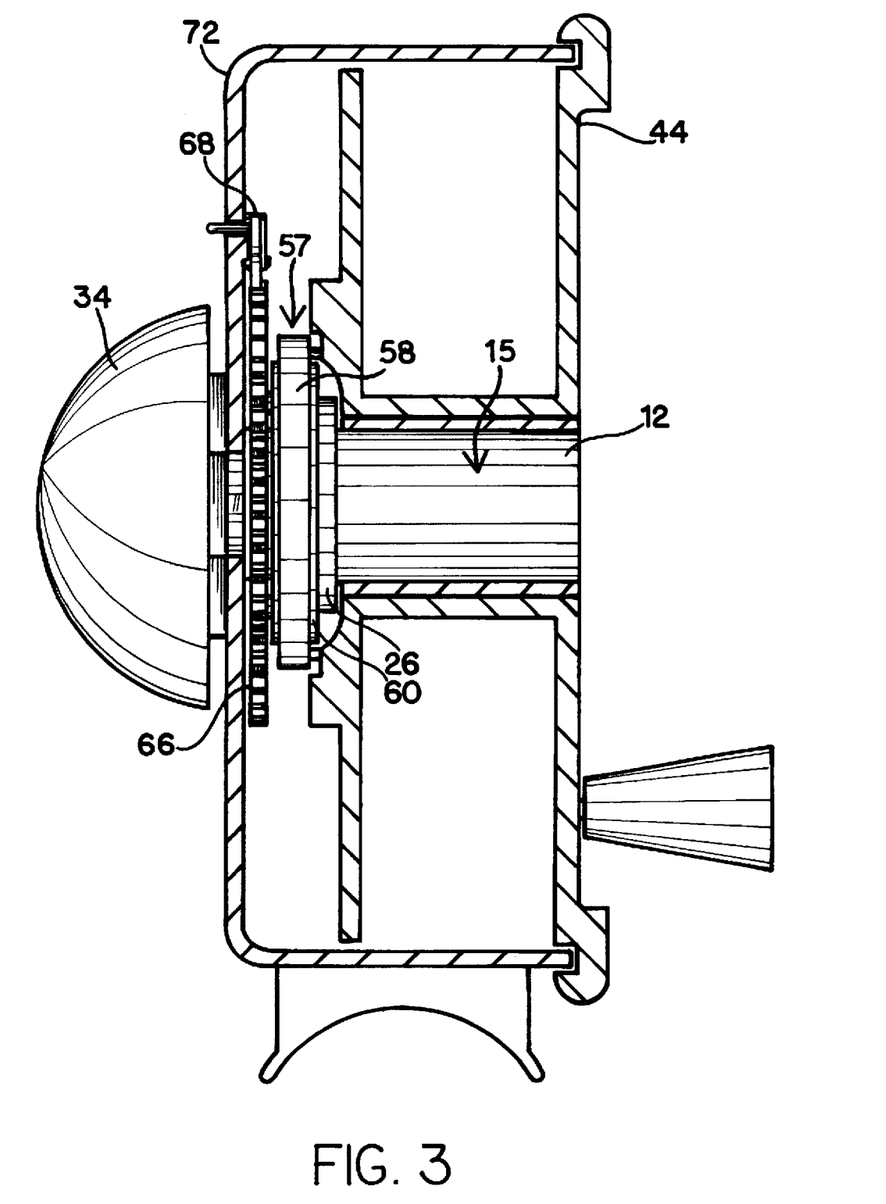
FIG. 3 is a conceptual sectional representational side view of the improved casting fishing reel.

My improved casting reel 10 is shown in conceptual format in FIG. 3. At the heart of the reel is reel spindle 12 about which line spool 44 rotates. Inside of reel spindle 12 is a clutch assembly 15 which applies pressure to pressure plate 26, which in turn applies pressure against inner race 60 of torque converter assembly 571.

Torque converter assembly 57 is a mechanical torque converter having an inner race 60 and outer race 58. Inner race 60 is frictionally engaged against pressure plate 26. Clutch assembly 15 is adjustable to increase or decrease the pressure of pressure plate 26 by means of handle 34.

Outer race 58 of torque converter assembly 57 is attached to line spool 44 by means of four drive lugs. Outer race 58 is free to rotate around inner race 60 in one direction to take in line, however, in the opposite direction, where line is being taken out, it locks up with inner race 60 and only rotates with inner race 60, which is frictionally engaged with pressure plate 26.

Figure 4:
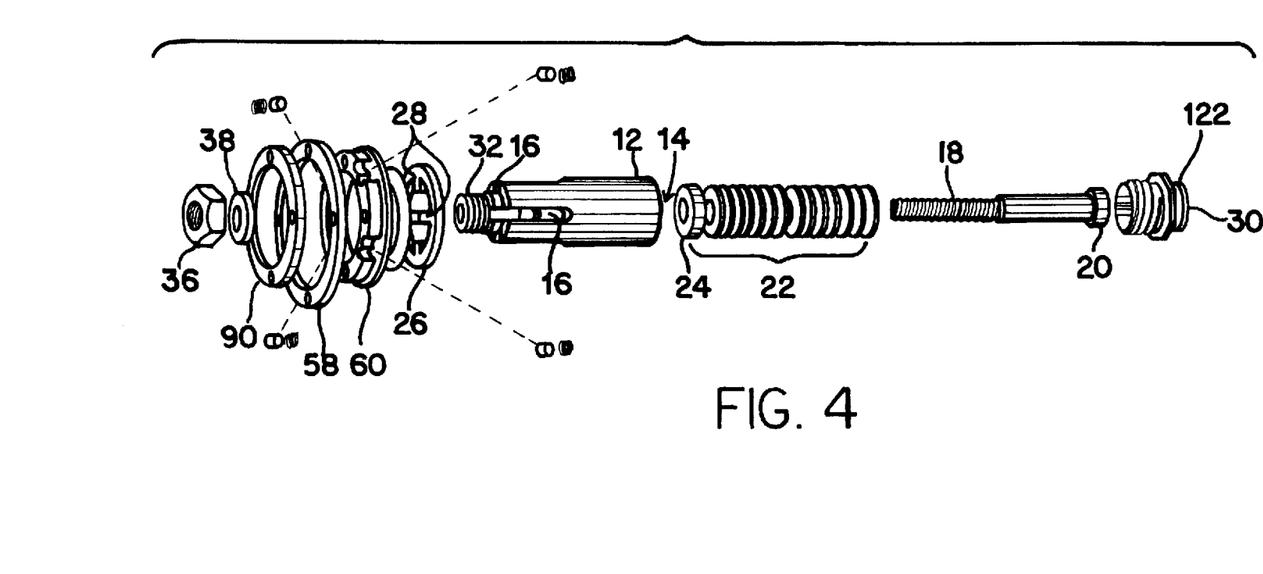
FIG. 4 is an exploded perspective representational view of the clutch and torque converter assemblies.
Figure 6:
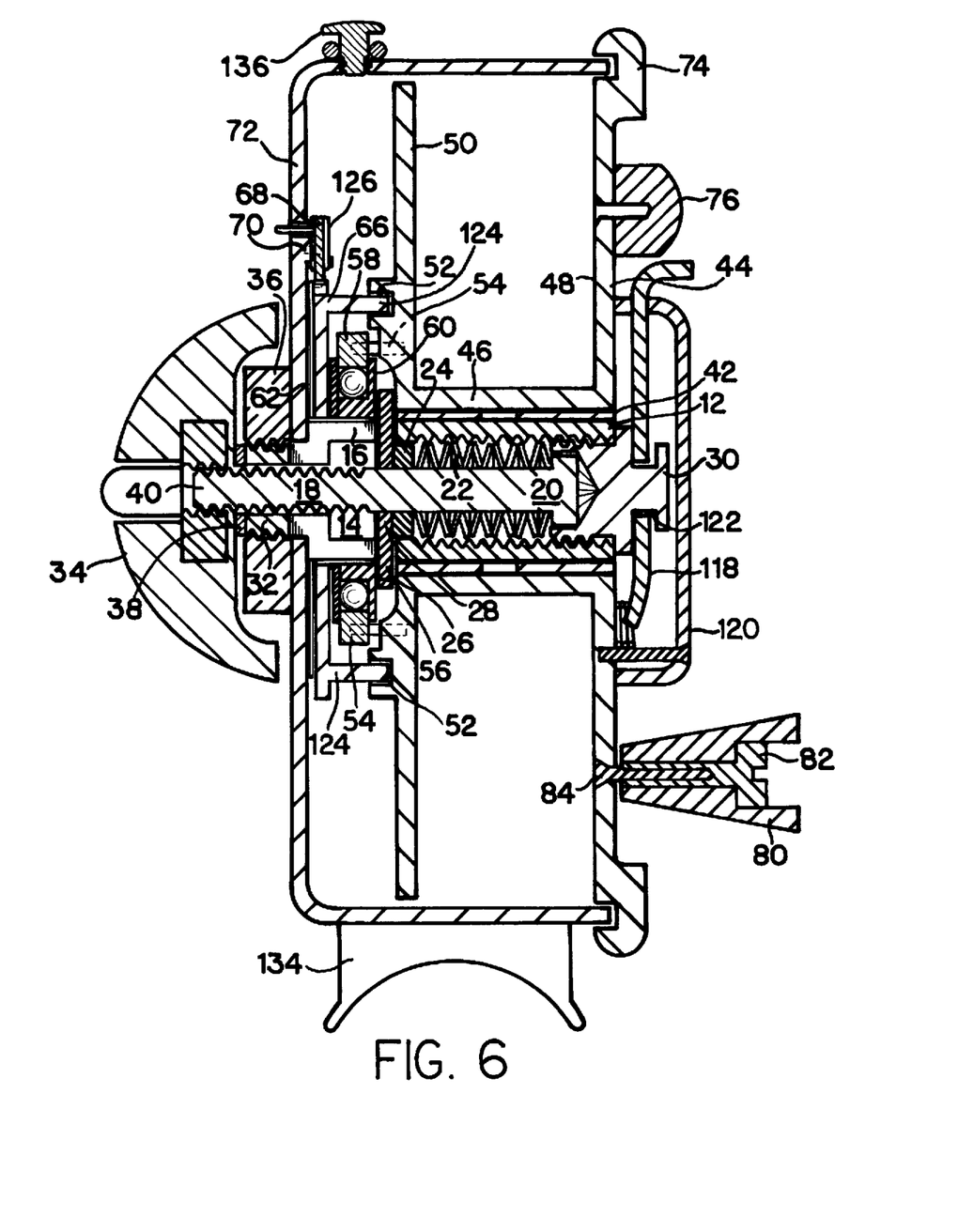
FIG. 6 is a detailed sectional side view of the improved casting fishing reel.

A more detailed view of clutch assembly 15 is shown in FIGS. 4 and 6. Reel spindle 12 is hollow and serves as clutch cavity 14. A plurality of clutch spring washers 22 are axially held on clutch shaft 18 which is also known as a draw bar, which is threaded at one end and provided with shaft stop 20 at the other. Clutch plate 24, which is a bearing surface, caps the end of the plurality of the clutch spring washers 22. Clutch Shaft 18 is threaded through clutch shaft traveler nut 32 formed integral with reel spindle 12 to provide a means of compressing spring washers 22, thereby forcing clutch plate 24 towards the traveler nut end of reel spindle 12.

Reel spindle 12 is provided, in the preferred embodiment, with four slots 16 through which interfit corresponding pressure plate flutes 28 formed integral with pressure plate 26. In the preferred embodiment, clutch assembly locking nut 36, formed integral with handle 34, and slide washer 38 are used to draw in or extend away clutch shaft 18 to tighten or loosen the pressure against the plurality of clutch spring washers 22, thereby adjusting the amount of force that pressure plate 26 will exert against inner race 60 of torque converter assembly 57.

Torque converter assembly 57, as shown in FIGS. 4, 5, 6, 7A and 7B, is formed of two concentric races, inner race 60 and outer race 58. Outer race 58 rides upon bearing surface 86 of inner race 60. Outer race 58, in the preferred embodiment, is provided with four screw holes 96, which are used in conjunction with screws 54 to firmly attach outer race 60 to line spool front plate 50.

Figure 5:
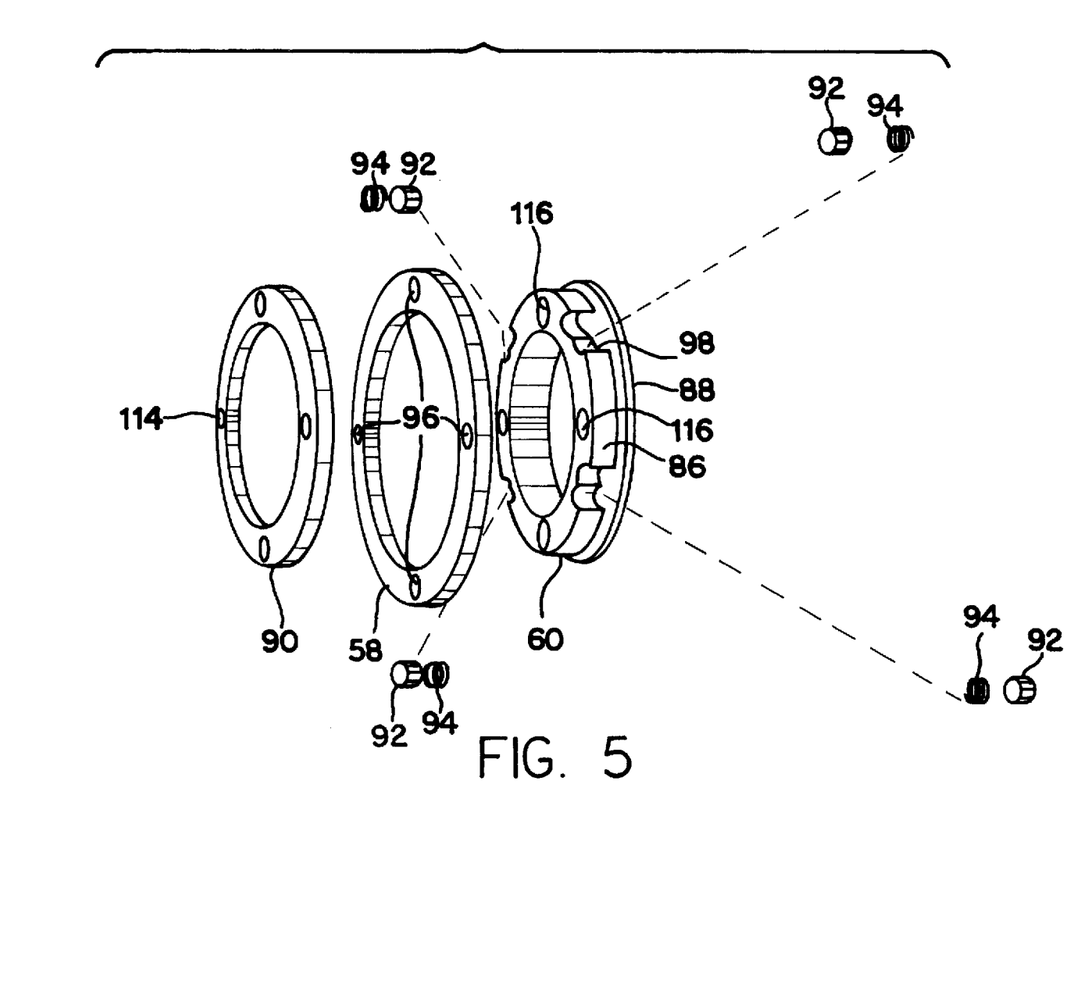
FIG. 5 is an exploded perspective representational view of the torque converter assembly.

Inner race 60 is provided with a plurality, and in the preferred embodiment four, roller bearing cavities 98 each having two sections, the first being spring section 100 and the second roller bearing section 102. Roller bearings 92 and springs 94 are held in position within cavities 98, as is outer race 58 against bearing surface 86 by means of containment plate flange 90, as is shown in FIGS. 5 and 6.

Figure 7A:
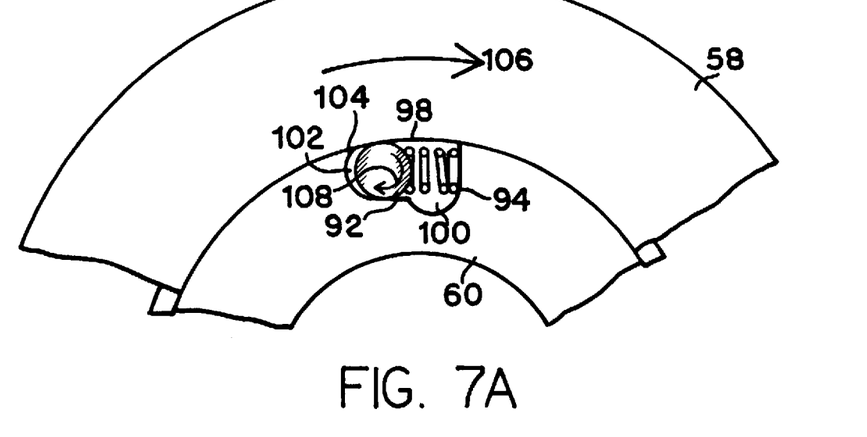
FIG. 7A is a partial representational plan view of the torque converter showing its configuration in a free rotation of the outer race direction.

As shown in FIG. 7A, when outer race 58 is rotating in the direction shown by arrow 106, roller bearing 92 will rotate in the direction shown by arrow 108, and is held within roller bearing cavity 102 by means of spring 94. In the preferred embodiment, spring 94 is a simple coil spring of known spring strength and rate. As shown in FIG. 7A, outer race 58 rotates freely around inner race 60.

Figure 7B:
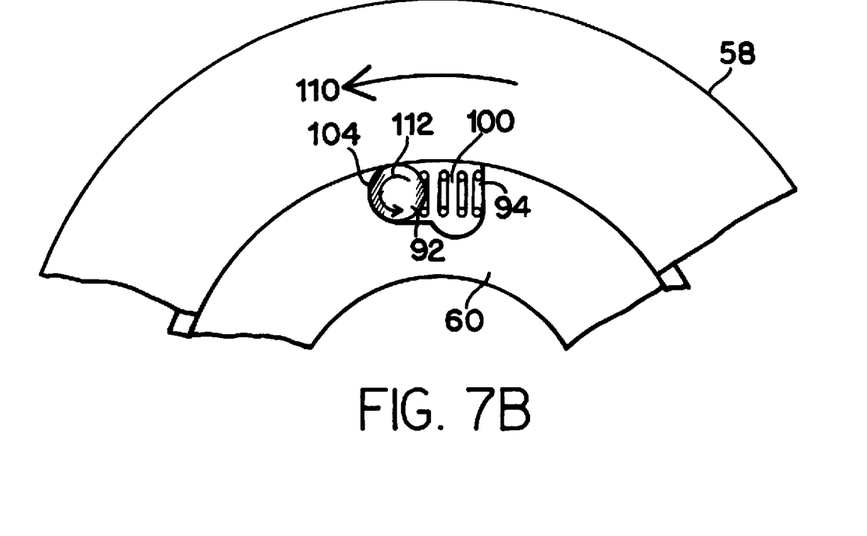
FIG. 7B is a partial representational plan view of the torque converter showing its configuration in an outer race engaged with the inner race rotational direction.

FIG. 7B, shows what happens when outer race 58 is rotated in the opposite direction, as shown by arrow 110. As can be seen, roller bearing 92 which is engaged against the inner race surface of outer race 58, rotates in the opposite direction to that of FIG. 7A, in the same general direction as shown by arrow 112. In this case, roller bearing 92 wedges in a taper lock against wedge point 104 and outer race 58. What happens is that bearings 92, wedge between wedge point 104 of inner race 60 and the inside surface of outer race 58, when rotation in the direction shown for arrow 110 is attempted. Thus, there is no ratchet and pawl, hence no significant rotational delay before outer race 58 engages with inner race 60. Since inner race 60 is in frictional engagement with pressure plate 26, the result is that when a fish strikes the hook and attempts to take out line, there is an instantaneous engagement of the torque converter and the fish hook can be set with much more certainty.

To reverse the permissible rotation direction of torque converter assembly 57, one merely takes the entire assembly off of reel spindle 12 and turns it around, such that the containment plate flange 90 is frictionally engaged with pressure plate 26.

Referring to FIG. 6, it can be seen that line spool 44 is formed of front plate 50 which is attached by means of drive lugs or screws 54 to outer race 58, line spool spindle 46 and line spool back plate 48. In the preferred embodiment, an oil impregnated spindle bearing 42 is provided between the outer surface of reel spindle 12 and the inner surface of line spool spindle 46. Line spool 44 is held in place at the back of reel spindle 12 by means of clip 118 which interfits over the bearing surface of notch 122 formed integral in threaded spindle plug 30. Clip 118 is in compressive engagement with the line spool back plate 48, and rotates with it. All of this is held within back case 120, which is screwed, by conventional means to line spool back plate 48, to provide a cosmetically pleasing appearance and also to prevent snagging clip 118 as line spool 44 rotates.

Figure 8A:
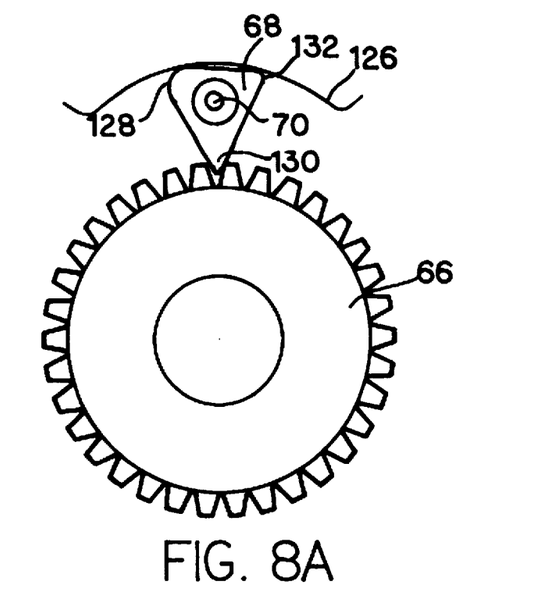
FIG. 8A is a representational plan view of the clicker gear and pawl assembly in a loud click configuration.
Figure 8B:
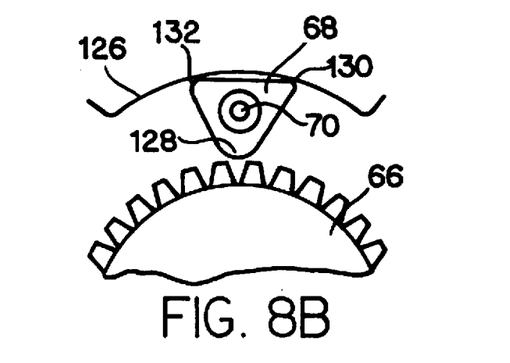
FIG. 8B is a representational plan view of the clicker gear and pawl assembly in a no click configuration.

In the preferred embodiment, interfitting between pressure plate 26 and inner race 60 is a Teflon pressure plate bearing washer 56. On the opposite side of containment plate flange 90 there is found clicker gear 66. In the preferred embodiment, clicker gear 66 is formed of plastic, however, a number of other suitable materials could be used, primarily those made of metal. In the preferred embodiment, as is shown in FIG. 6, clicker gear 66 is attached to the line spool front plate 50 by means of plastic posts 124 which compressively interfit within mating holes 52 in line spool front plate 50. Between clicker gear 66 and outer housing 72 is spacer washer 62. The purpose of clicker gear 66 is to provide a source of clicking noise when its teeth are engaged against clicker pawl 68, so as to supply information to the user as to the rate at which line is being taken out or being brought in during fishing. As shown in FIG. 6 and FIGS. 8A through 8C, the teeth of clicker gear 66 engage with clicker pawl 68. Clicker pawl 68 is rotatably hinged and held against outer housing 12 by means of pivot pin 70 and in resilient spring-like engagement with pawl leaf spring 126. As clicker gear 66 rotates, its teeth may engage against the pointed end of pawl 68, and as they pass by, snap pawl 68 against spring 126, and as the tooth clears, pawl 68 snaps back thereby making a clicking sound. There are three corners to the generally triangular shaped pawl 68. The blunt corner, 128, when set in the configuration shown in FIG. 8B, provides a shorter pawl which does not engage with the teeth of clicker gear 66. Thus, rotation of the clicker gear will not produce a clicking noise in this configuration. The other two corners of pawl 68, namely corners 130 and 132, are each of different radiuses and extension from pivot pin 70. Corner 130 extends the farthest out from pivot pin 70, and thus engages the most deeply into the teeth of clicker gear 66, as is shown in FIG. 8A. It also has the sharpest, variable radius, wherein the radius of corner 130 which is on the side pointing toward corner 128 is sharper, and the radius on the side of corner 130 pointing toward corner 132 is larger. Therefore, when it passes over the teeth of clicker gear 66 as it rotates in a clockwise direction, the sharp radius of that side of corner 130 will cause pawl 68 to snap quickly over the gear tooth and on to the next tooth, thereby producing a sharp, loud, clicking noise. Thus, by selecting this corner 130 of pawl 68, the user can select a relatively loud snap-like click for one direction, and a softer click for the other.

Figure 8C:
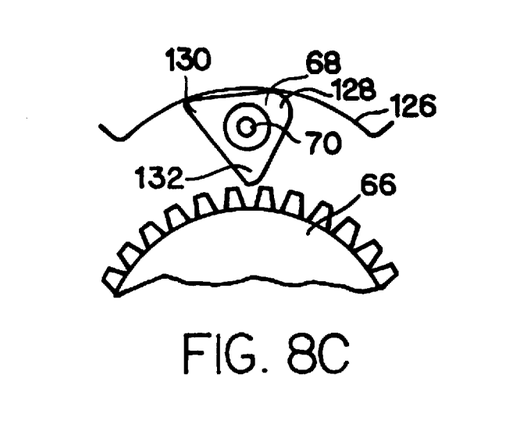
FIG. 8C is a representational plan view of the clicker gear and pawl assembly in a soft click configuration.

In a similar fashion, if pawl 68 is rotated to engage corner 132 with the teeth of clicker gear 66 as shown in FIG. 8C, corner 132 is slightly closer to pivot pin 70, and as a result does not engage as deeply into the teeth of clicker gear 66. Thus, in this configuration, the clicking noises are quieter than they are if corner 130 is used.

As illustrated above, clicker noise can be varied by indexing the pawl 68 to engage the gear 66 with tooth 130 (loud) or tooth 132 (soft). A second set of relative noise levels can be obtained by flipping the pawl 68 over from side to side. This changes the corner of the pawl, which when rotated, engages the leaf spring 126. The larger radius corner, as it rotates against the spring 126, will produce less spring 126 deflection. Less snap back force will result, producing less noise. Conversely, the larger radius corner will produce more springlike deflection, more snap back force and more noise.

As shown in FIG. 6 outer housing 72 is configured to interfit within housing slot assembly 74 formed integral with line spool back plate 48. This provides a clean, relatively weather proof case for line spool 44. The assembly is completed by the addition of handle 80, which is rotatable around handle axle 82 which is screwed by means of screw 84 into line spool back plate 48. Opposite handle 80 is counter-weight 76 which is also screwed by screw 78 to line spool back plate 48. Finally, to complete the assembly, some sort of conventional pole mounting bracket 134 is provided. Also provided is tippet cleat 136 attached to outer housing 72 for attachment to the tippet when the reel is not in use.

(Tippet holder). Tippet shoulder screw 136, with a rubber '0' ring seated against its shoulder is threaded into frame 72, the '0' ring is slightly compressed. The fly line tippet can be slid between '0' ring and the frame 72. The slight compression on the '0' ring will hold the tippet (end of fly line) in place, securing it for transport.

In operation, line is wound onto spool 44, and passes out through a line hole (not shown) for use with a fishing pole. Handle 34 is then used to draw clutch shaft 18 in or out to adjust the pressure exerted by clutch plate 24 against flutes 28 of pressure plate 26. Pressure plate 26 is in frictional engagement with inner race 60 of torque converter assembly 57. Outer race 58 is attached to spool 44, and freely rotates in the line taken in direction. In the line taken out direction, the outer race 58 locks up with inner race 60 and as a result line spool 44 undergoes compressive frictional braking during rotation in the like taken out direction.

While there is shown and described the present preferred embodiment of the invention, it is to be distinctly understood that this invention is not limited thereto but may be variously embodied to practice within the scope of the following claims.

I claim:

1. A casting reel which comprises:
   a stationary reel spindle having a clutch cavity;
   a clutch assembly contained within said clutch cavity of said stationary reel spindle for frictional engagement with a pressure plate, said clutch assembly having a clutch plate;
   a torque converter having a first race and a second race, said second race being free to rotate in one direction and engaged with and rotating with said first race in the other direction, said first race being in frictional engagement with said pressure plate,
   said pressure plate slideably mounted on said stationary reel spindle and in frictional engagement with said clutch plate and with said first race of said torque converter; and
   a line spool rotatably mounted around said stationary reel spindle and attached to the second race of said torque converter.

2. The casting reel of claim 1 wherein said torque converter further comprises:
   a plurality of rollers, each held in a cavity within the first race and in engagement with the second race;
   a plurality of springs, each configured for resilient engagement with a roller; and
   said first race having a plurality of cavities, each of said cavities having first and second sections with a wedge point, said first section configured to hold a spring for pushing a roller into said second section, and said second section configured to hold a roller in rotatable engagement within said second section and with said second race when said second race rotates in one direction, and when said second race rotates in the other direction, for non-rotational engagement with the wedge point and said second race; and
   a plurality of rollers, each held in a cavity within said first race and, resiliently held in engagement with said second race by a spring.

3. The casting reel of claim 2 wherein said clutch assembly further comprises:
   a traveler nut formed integral with an end of the clutch cavity of said stationary reel spindle;
   a clutch shaft having a stop plate at one end, and threadably engaged at the other end to said traveler nut for selectable translational movement of the stop plate towards or away from the traveler nut;
   a plurality of spring washers held on said clutch shaft;
   a clutch plate held on said clutch shaft for frictional engagement with both said plurality of spring washers and the pressure plate; and
   means for selectively translationally moving the clutch shaft to adjust the compression of the spring washers.

4. The casting reel of claim 3 which further comprises:
   a plurality of slots being formed in said stationary reel spindle at the same end as that to which said traveler nut is attached; and
   said pressure plate being provided with a plurality of inwardly extending flutes each of which interfit within one of said slots and engage against said clutch plate.

5. The casting reel of claim 2 which further comprises means for producing a clicking sound when the line spool rotates.

6. The casting reel of claim 5 wherein said means for producing a clicking sound further comprises:
   a frame member attached to said stationary reel spindle;
   a spur gear having a plurality of teeth, attached to, and rotatable with said line spool;
   a pawl leaf spring attached to the frame member and in resilient engagement with a clicker pawl; and
   a clicker pawl pivotally attached at a pivot point to said frame member and having at least one corner of a preselected radius oriented toward, interfitting within, and ratcheting over the teeth of said spur gear to produce a clicking sound as said spur gear rotates with said line spool, said clicker pawl being held in resilient engagement between said pawl leaf spring and the teeth of the spur gear.

7. The casting reel of claim 6 wherein said clicker pawl further includes a plurality of corners, each extending a different distance from the pivot point for selectable ratcheting over the teeth of said spur gear at a different interfitting distance within the teeth of said spur gear for producing a selectable amount of clicking sound as said spur gear rotates; and
   means for reorienting said clicker pawl to select which corner of said pawl interfits within the teeth of said spur gear.

8. The casting reel of claim 7 wherein said clicker pawl further includes a plurality of corners, each having a different radius for producing a different clicking sound as said spur gear rotates; and
   means for reorienting said clicker pawl to select which corner of said pawl interfits within the teeth of said spur gear.

9. The casting reel of claim 6 wherein said clicker pawl further includes a plurality of corners, each having a different radius for producing a different clicking sound as said spur gear rotates; and means for reorienting said clicker pawl to select which corner of said pawl interfits within said teeth of the spur gear.

10. The casting reel of claim 1 wherein said clutch assembly further comprises:

a traveler nut formed integral with an end of the clutch cavity of said stationary reel spindle;

a clutch shaft having a stop plate at one end, and threadably engaged at the other end to said traveler nut for selectable translational movement of the stop plate towards or away from the traveler nut;

a plurality of spring washers held on said clutch shaft;

a clutch plate held on said clutch shaft for frictional engagement with both said plurality of spring washers and said pressure plate; and means for selectively translationally moving the clutch shaft to adjust the compression of the spring washers.

11. The casting reel of claim 10 which further comprises:

a plurality of slots being formed in said stationary reel spindle at the same end as that to which said traveler nut is attached; and said pressure plate being provided with a plurality of inwardly extending flutes, each of which interfit within one of said slots and engage against said clutch plate.

* * * * *